United States Patent
Cabaussel

(10) Patent No.: US 10,461,537 B2
(45) Date of Patent: Oct. 29, 2019

(54) METHOD TO DRIVE A POWER CONTROL DEVICE CONNECTED TO UNBALANCED THREE-PHASE LOADS WHEN NO NEUTRAL REFERENCE IS AVAILABLE IN AN ALTERNATIVE ELECTRICAL NETWORK

(71) Applicant: EUROTHERM LIMITED, Telford (GB)

(72) Inventor: Remi Cabaussel, Courzieu (FR)

(73) Assignee: EUROTHERM LIMITED, Telford, Shropshire (GB)

( * ) Notice: Subject to any disclaimer, the term of this patent is extended or adjusted under 35 U.S.C. 154(b) by 0 days.

(21) Appl. No.: 15/846,486

(22) Filed: Dec. 19, 2017

(65) Prior Publication Data

US 2019/0190267 A1   Jun. 20, 2019

(51) Int. Cl.
*H02J 3/18* (2006.01)
*H02P 23/26* (2016.01)
*H02J 3/26* (2006.01)

(52) U.S. Cl.
CPC .............. *H02J 3/1892* (2013.01); *H02J 3/26* (2013.01); *H02P 23/26* (2016.02)

(58) Field of Classification Search
None
See application file for complete search history.

(56) References Cited

U.S. PATENT DOCUMENTS

| | | |
|---|---|---|
| 3,895,275 A | 7/1975 | Rostad |
| 4,065,804 A | 12/1977 | Rostad |
| 4,779,034 A | 10/1988 | Shepard, Jr. |
| 5,243,489 A | 9/1993 | Doughtery |
| 8,222,982 B2 | 7/2012 | Sullivan et al. |
| 2002/0079859 A1* | 6/2002 | Lumsden ............... H02P 27/02 318/727 |
| 2003/0052643 A1 | 3/2003 | Sweo |
| 2009/0058341 A1 | 3/2009 | Lu et al. |
| 2010/0231150 A1 | 9/2010 | Tan |
| 2012/0038300 A1 | 2/2012 | Kato |

(Continued)

OTHER PUBLICATIONS

Collins, Chuck, Lawrence B. Farr, and David B. Durocher. "Process modernization upgrade: Selecting and installing a new medium-voltage motor control center." Industry Applications Society Annual Meeting, 2016 IEEE. IEEE, 2016.

(Continued)

*Primary Examiner* — Alex Torres-Rivera
*Assistant Examiner* — Henry E Lee, III
(74) *Attorney, Agent, or Firm* — Locke Lord LLP

(57) ABSTRACT

A method for operating an unbalanced load manager for a three-phase induction motor or heater, includes receiving, by a load manager, values representative of current flow sensed by current sensors and voltages sensed by voltage taps corresponding to phases of a three-phase power system providing power to the motor or heater. The method includes detecting, by the load manager, a transition from positive or negative to zero current, to measure a phase shift between line-to-line and current. The method further includes synchronizing, by the load manager, firing from line-to-line signal to line-to-neutral signal of phases of the three-phase power system, using the measured phase shift between line-to-line and current.

5 Claims, 12 Drawing Sheets

(56) References Cited

U.S. PATENT DOCUMENTS

| | | |
|---|---|---|
| 2012/0262103 A1 | 10/2012 | Ek et al. |
| 2013/0127390 A1 | 5/2013 | Dacunha et al. |
| 2013/0241463 A1 | 9/2013 | Bando |
| 2014/0180611 A1 | 6/2014 | Jefferies et al. |
| 2014/0321176 A1 | 10/2014 | Seagren et al. |
| 2015/0309094 A1 | 10/2015 | Morassutto et al. |
| 2015/0349387 A1 | 12/2015 | Inaba |
| 2016/0156291 A1 | 6/2016 | Becker |
| 2017/0047869 A1 | 2/2017 | Edwards |

OTHER PUBLICATIONS

Definitions of Voltage Unbalance; IEEE Power Engineering Review, vol. 21, Issue 5; May 2001.

New Unbalance Factor for Estimating Performance of a Three-Phase Induction Motor With Under- and Overvoltate Unbalance; IEEE Transactions on Energy Conversion, vol. 25, No. 3, pp. 619-625, Sep. 2010.

Extended European Search Report dated May 20, 2019 for Application No. 18206373.5-1202.

\* cited by examiner

Electrical convention for direct system on 3S load coupling

Waveform on balanced pure resistive load on direct system: $Z_1 = Z_2 = Z_3$

Waveform on pure resistive load on direct system: $Z3 = \infty$; $Z1 = Z2$

Waveform with correction on slightly inductive load ($\Phi = \pi/12$) on direct system: $Z3 = \infty$; $Z1 = Z2$.

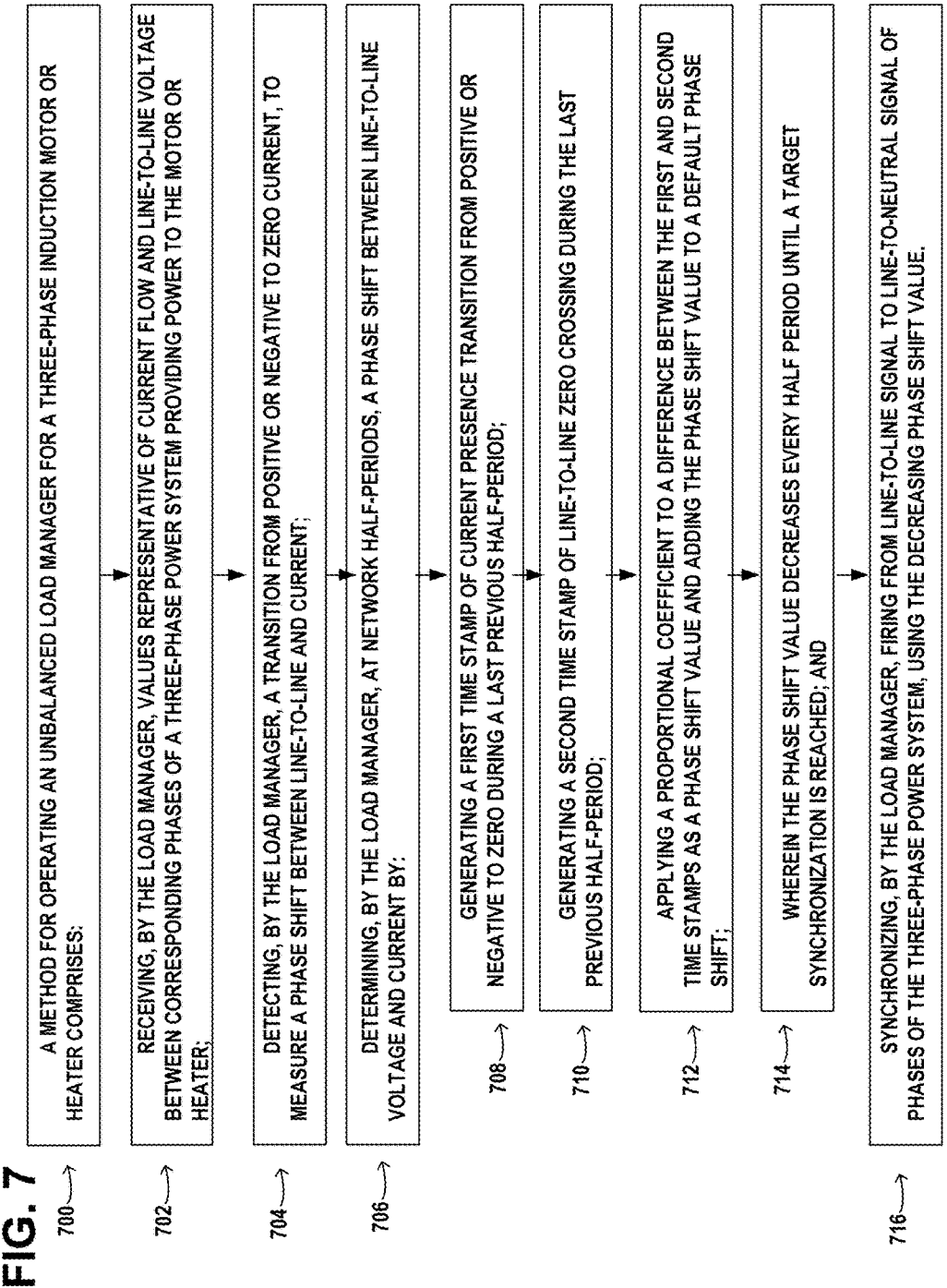

METHOD TO DRIVE A POWER CONTROL DEVICE CONNECTED TO UNBALANCED THREE-PHASE LOADS WHEN NO NEUTRAL REFERENCE IS AVAILABLE IN AN ALTERNATIVE ELECTRICAL NETWORK

BACKGROUND OF THE INVENTION

1. Field of the Invention

A three-phase unbalanced load manager includes three-phase firing control that synchronizes a three-phase load on line-to-neutral electrical waveforms, without the need of any electrical neutral reference. The invention accomplishes this by measuring phase shift between line-to-line voltage and current to synchronize power driving on a line-to-neutral waveform.

2. Discussion of the Related Art

Three-phase induction motors have three windings in the stator, which when connected to power lines supplying alternating voltage and current in three-phases, cause magnetic flux to rotate in a positive sequence direction within the stator. The rotor within the stator has an arrangement of closed-loop coils that can rotate and have current induced in them by the rotating magnetic field of the stator windings, forcing the rotor to rotate in the same direction as the positive sequence direction of the magnetic flux within the stator.

As long as the power supply voltages and currents are equal in magnitude in the three-phases, i.e. balanced, the magnetic flux rotates in the positive sequence direction within the stator. However, voltages and currents may occasionally become unbalanced in the three-phases of the power supply lines, for example due to faults in a distribution transformer or unbalanced distribution of single phase loads on the same branch circuit, such as a momentary current draw by starting-up large electrical machinery or by a heavy arc welder.

A three-phase motor may continue to operate with unbalanced voltages and currents, however its efficiency is reduced by both increased current and increased resistance due to heating. The stator winding with the highest current will have the greatest overheating, resulting in deterioration of the insulation of the stator winding. During power supply unbalance, currents flow through the stator windings in a negative sequence direction, resulting in induction of negative sequence voltage in the rotor coils, abnormal current flow, and overheating.

Under conditions of balanced voltages and currents, where the motor operates at a continuous load for a sufficient time, its operating temperature reaches thermal equilibrium. Each motor has a characteristic safe maximum operating temperature permitted by the motor design, above which permanent damage may begin to occur to insulating layers and other components. Under conditions of current phase unbalance, the stator windings generate heat at an increased rate causing a faster rise in the temperature of the surrounding core. The time interval necessary to raise the temperature of the core to the maximum operating temperature is the trip time after the detection of the unbalance condition. To avoid permanent damage to the motor, prior art load managers set a fixed threshold for detected current phase unbalance.

The state of the art in phase unbalance compensation circuits for three-phase motors may be represented by U.S. Pat. No. 5,243,489, which discloses a plurality of operational amplifiers connected to current transformers in the three-phases, to provide a signal output when a phase unbalance is detected. The operational amplifiers determine whether there is any difference between pairs of voltage phases that is greater than a threshold value K. The threshold value K is a constant whose value may be manually set over a range of operating conditions.

A problem with the state of the art is that on a three-phase alternative electrical network, power control of an electrical load can be managed without the need of any electrical neutral reference. However power control device should always be synchronized on line-to-neutral waveforms to achieve efficient driving, i.e. to deliver desired power with accuracy and not to generate electromagnetic compatibility (EMC) emissions. When a single load breaks or more generally when loads are unbalanced, it is not possible thereafter to synchronize correctly and side effects occur, such as unwanted EMC conducted emission or inaccurate power delivery.

What is needed is a way to synchronize electrical power control of a three-phase load on line-to-neutral electrical waveforms, without the need of any electrical neutral reference and whatever load unbalancing ratio.

SUMMARY OF THE INVENTION

In accordance with an example embodiment of the invention, an unbalanced load manager synchronizes electrical power control of a three-phase load on line-to-neutral electrical waveforms, without the need of any electrical neutral reference and whatever load unbalancing ratio.

A three-phase unbalanced load manager includes three-phase firing control that synchronizes a three-phase load on line-to-neutral electrical waveforms, without the need of any electrical neutral reference. The invention accomplishes this by measuring phase shift between line-to-line voltage and current to synchronize power driving on a line-to-neutral waveform.

In an example embodiment of the invention, a plurality of current sensors associated with the unbalanced load manager, connect with corresponding phases of a three-phase power system providing power to a three-phase motor or heater. Each current sensor provides a value representative of current flow it senses through each corresponding phase of the three-phase power system. A plurality of voltage taps associated with the unbalanced load manager, connect with the corresponding phases of the three-phase power system providing power to the three-phase motor or heater. Pairs of the voltage taps provide line-to-line voltage between corresponding phases of the three-phase power system.

A memory in the load manager, is configured to store a thyristor or SCR firing calculation algorithm.

A processor in the load manager, coupled to the memory and the plurality of current sensors and voltage taps, is configured to synchronize firing from line-to-line signal to line-to-neutral signal, using a current presence signal to dynamically measure the phase shift and accordingly adjust firing synchronization. By checking the transition from positive or negative to zero current, the phase shift between line-to-line and current can be measured.

In an example embodiment of the invention, a method for operating an unbalanced load manager for a three-phase induction motor or heater comprises:

receiving, by the load manager, values representative of current flow and line-to-line voltage between corresponding phases of a three-phase power system providing power to the motor or heater;

detecting, by the load manager, a transition from positive or negative to zero current, to measure a phase shift between line-to-line and current;

determining, by the load manager, at network half-periods, a phase shift between line-to-line voltage and current by:

generating a first time stamp of current presence transition from positive or negative to zero during a last previous half-period;

generating a second time stamp of line-to-line zero crossing during the last previous half-period;

applying a proportional coefficient to a difference between the first and second time stamps as a phase shift value and adding the phase shift value to a default phase shift;

wherein the phase shift value decreases every half period until a target synchronization is reached; and synchronizing, by the load manager, firing from line-to-line signal to line-to-neutral signal of phases of the three-phase power system, using the decreasing phase shift value.

The resulting unbalanced load manager synchronizes electrical power control of a three-phase load on line-to-neutral electrical waveforms, without the need of any electrical neutral reference and whatever load unbalancing ratio.

DESCRIPTION OF THE FIGURES

Example embodiments of the invention are depicted in the accompanying drawings that are briefly described as follows:

FIG. 7 illustrates an example embodiment of the invention, showing a system flow diagram of an example method for operating an unbalanced load manager for a three-phase induction motor or heater.

DETAILED DESCRIPTION OF EMBODIMENTS OF THE INVENTION

In accordance with an example embodiment of the invention, an unbalanced load manager synchronizes electrical power control of a three-phase load on line-to-neutral electrical waveforms, without the need of any electrical neutral reference and whatever load unbalancing ratio.

Figure 1A:
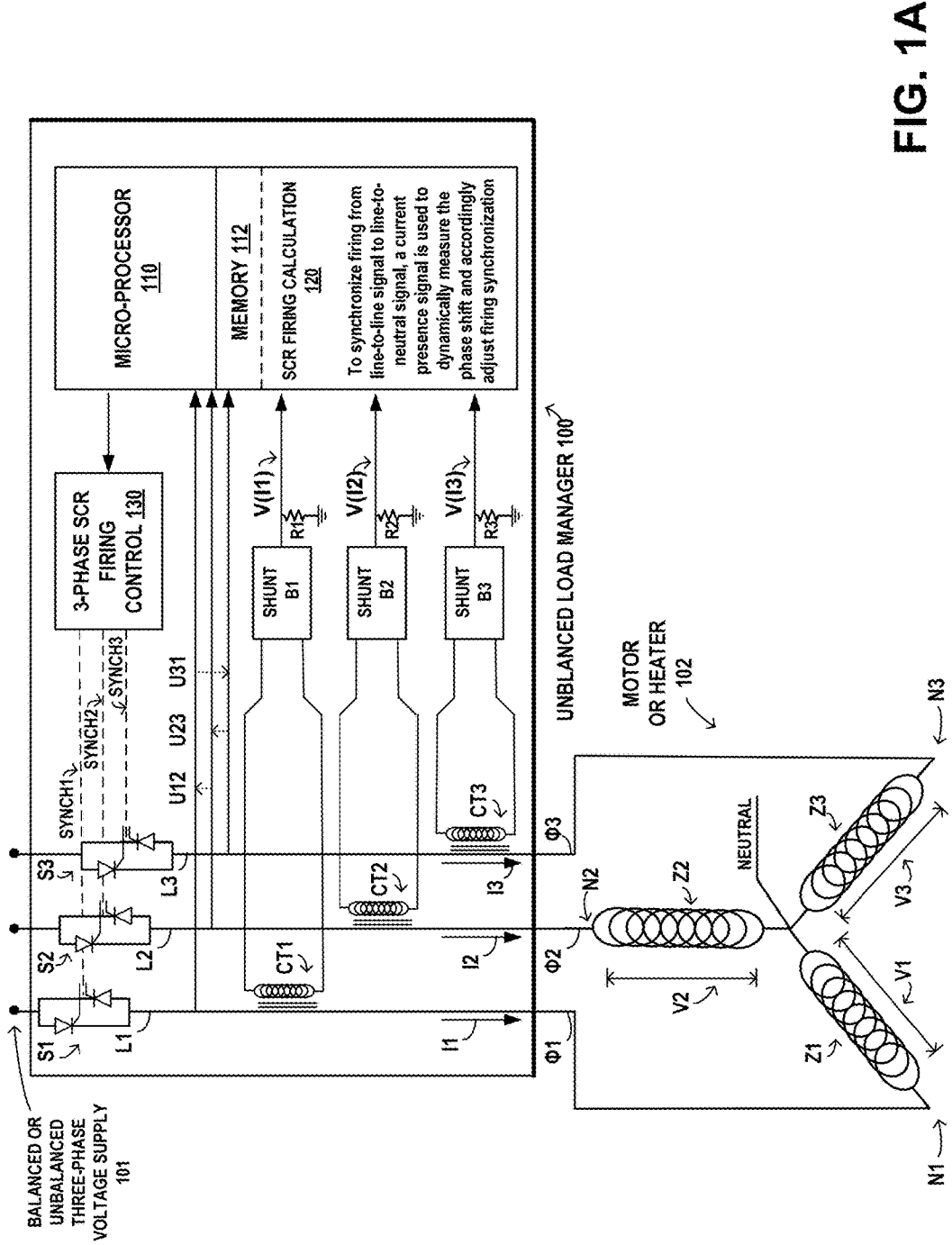
FIG. 1A is an example functional block diagram of the unbalanced load manager providing three-phase power to a star (3S) connected motor or heater, in accordance with an example embodiment of the invention.

FIG. 1A is an example functional block diagram of the unbalanced load manager 100, in accordance with an example embodiment of the invention. The load manager 100 is connected to a balanced or unbalanced three-phase voltage supply 101. The balanced or unbalanced three-phase voltage supply 101 supplies a three-phase alternating current I1, I2, and I3 to lines L1, L2 and L3. This three-phase alternating current supply is fed to a three-phase motor 102, or alternately a three-phase heater, through full wave or back-to-back thyristor or SCR sets S1, S2, and S3, respectively. The unbalanced load manager 100 conducts three-phase currents I1, I2, and I3, to the power input nodes N1, N2, and N3 of the three-phase motor or heater 102. The stator winding or heater coil loads Z1, Z2, and Z3 are respectively connected between the power input nodes N1, N2, and N3 and neutral in the star (3S) configuration. Alternately, the stator winding or heater coil loads Z1, Z2, and Z3 may be connected between the power input nodes N1, N2, and N3 in the delta (3D) configuration. When the thyristor or SCR sets S1, S2, and S3 are conducting, three-phase currents I1, I2, and I3 are delivered to the loads Z1, Z2, and Z3.

The term "thyristor" includes many types of semiconductor switches, but the most widely used is the Silicon Controlled Rectifier (SCR). This paper refers to the SCR, but other types of thyristor devices may be substituted for the SCR as it is described herein. Each of the SCRs within the three sets S1, S2, and S3 only conducts when its anode is positive with respect to the cathode and a gate signal is applied, and two SCRs in each phase line form an inverse parallel connection that produces full wave control. The controlled output of the SCR sets S1, S2, and S3 is accomplished by varying the timing of the gate pulses supplied to each pair of the SCRs in each of the three-phase power lines via the gate firing line sets SYNCH1, SYNCH2, and SYNCH3, respectively output from the three-phase SCR firing control circuit 130.

The three-phase SCR firing control 130 controls the conduction state of the SCR sets S1, S2, and S3. The controlled output of the SCR sets S1, S2, and S3 is accomplished by varying the timing of the gate firing SYNCH1, SYNCH2, and SYNCH3 applied to each pair of SCRs in each of the three-phase power lines. Phase angle firing is accomplished by three-phase SCR firing control circuit 130 to turn on the SCRs during each consecutive half cycle. The turn-on point is varied within the half cycle time frame to achieve time control. If the gate pulse is applied early in the half cycle, the output is high. If the gate pulse is applied late in the cycle, only a small increment of the waveform is passed through, and therefore the output is low. The point at which the pulse is applied is continuously varied across the half cycle.

The current transformers CT1, CT2, and CT3 associated with the unbalanced load manager 100, are inductively coupled to the currents I1, I2, and I3, and output a sensing current to respective shunts B1, B2, and B3. The shunts B1, B2, and B3 output voltage signals V(I1), V(I2), and V(I3), to a microprocessor 110 and memory 112 in the unbalanced load manager. The V(I) waveform is identical to the current I waveform and the sign of the current may be detected and used by the SCR firing calculation algorithm 120. The current transformers CT1, CT2, and CT3 may be located inside the housing of the unbalanced load manager or they may be located outside of it. A plurality of voltage taps V1, V2, and V3 associated with the unbalanced load manager, connect with the corresponding phases of the three-phase power system providing power to the three-phase motor or heater. Pairs of the voltage taps provide line-to-line voltage U12, U23, and U31 between corresponding phases of the three-phase power system.

The microprocessor 110 and memory 112 receive and analyze the values representing the currents I1, I2, and I3, and the line-to-line voltage U12, U23, and U31 on the three-phase lines L1, L2 and L3, to determine and correct for voltage phase unbalance. The unbalanced load manager 100 automatically adjusts the point at which the firing pulse is applied by the three-phase SCR firing control 130 to the respective SCR set S1, S2, and S3, which in turn varies the voltage at the terminals N1, N2, and N3 to motor or heater 102. The microprocessor 110 and memory 112 sample the unbalanced three-phase voltage supply in lines L1, L2 and L3 and currents I1, I2, and I3, compares them, and command the three-phase SCR firing control 130 to correspondingly control the respective SCR sets S1, S2, and S3 to now provide a balanced three-phase voltage to the motor or heater 102. Each of the three-phase lines L1, L2, and L3 contains one set of the back-to-back SCRs S1, S2, and S3 and the microprocessor 110 and memory 112 sense voltage unbalance of each of these three phases and then adjusts the proper set of the phase angle of the SCRs to obtain a balanced voltage.

The memory 112 stores an SCR firing calculation algorithm 120. The processor 110 in the load manager 100, coupled to the memory 112 and the plurality of current transformers CT1, CT2, and CT3 and voltage taps V1, V2, and V3, is configured to synchronize firing from line-to-line signal to line-to-neutral signal, using a current presence signal to measure dynamically the phase shift and adjust firing synchronization accordingly.

With the invention, the unbalanced load manager synchronizes electrical power control of the three-phase load on line-to-neutral electrical waveforms, without the need of any electrical neutral reference and whatever load unbalancing ratio.

Figure 1B:
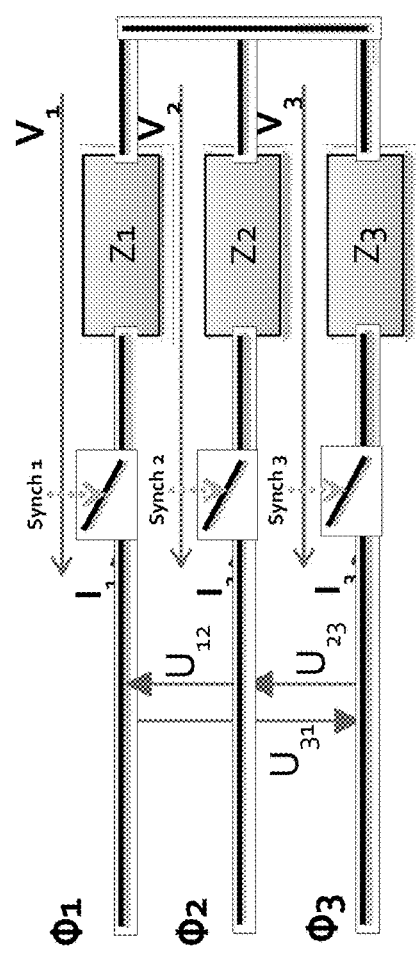
FIG. 1B is an example electrical convention for direct system on a star (3S) load coupling, in accordance with an example embodiment of the invention.

FIG. 1B is an example electrical convention for direct system on a star (3S) load coupling, in accordance with an example embodiment of the invention. The figure shows the currents I1, I2, and I3, and the line-to-line voltage U12, U23, and U31 on the three-phase lines L1, L2 and L3, and the voltages V1, V2, and V3 across the respective loads Z1, Z2, and Z3.

Figure 2A:
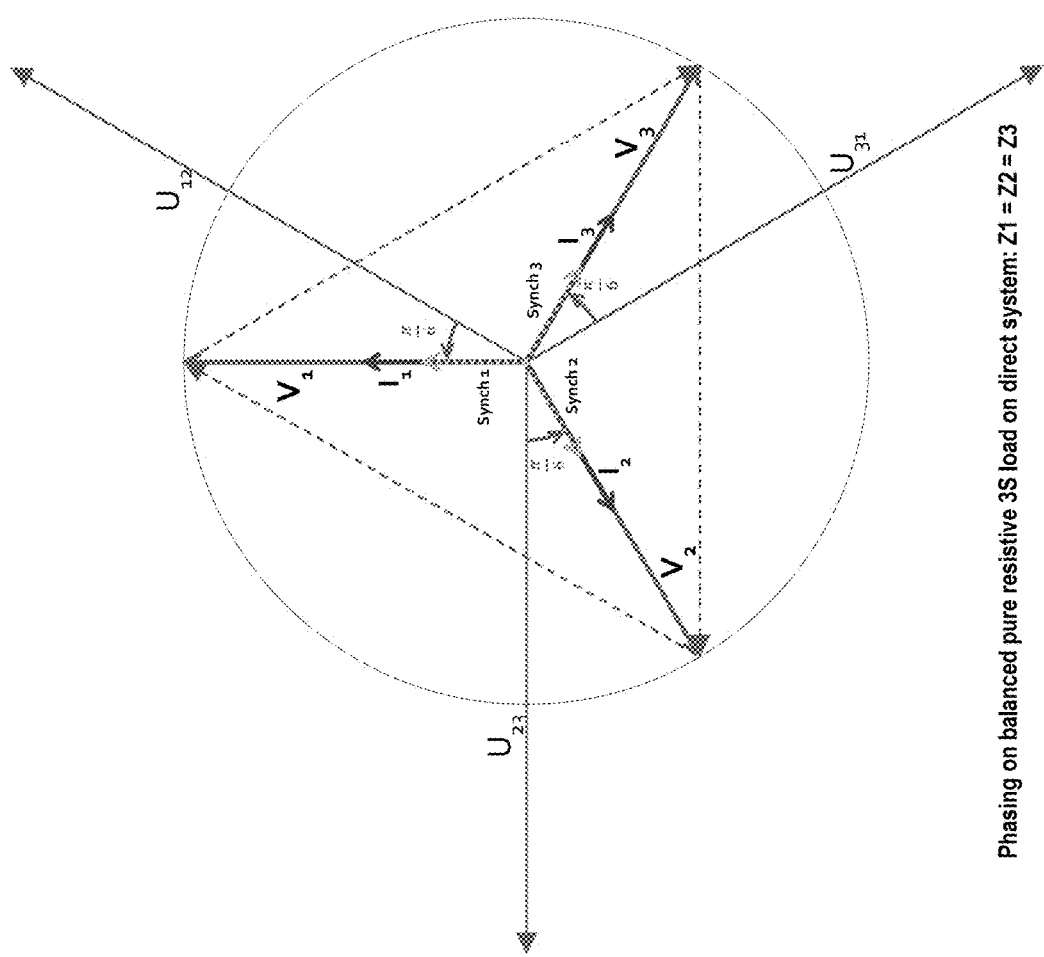
FIG. 2A is an example phasing diagram of a balanced pure resistive 3S load on direct system: Z1=Z2=Z3.

FIG. 2A is an example phasing diagram of a balanced pure resistive 3S load on direct system: Z1=Z2=Z3. On resistive loads, line-to-neutral voltage is actually synchronized with current and a $\pi/6$ phase shift of the gate firing is used to synchronize from the line-to-line voltage U12, U23, and U31 to the line-to-neutral signal.

Figure 2B:
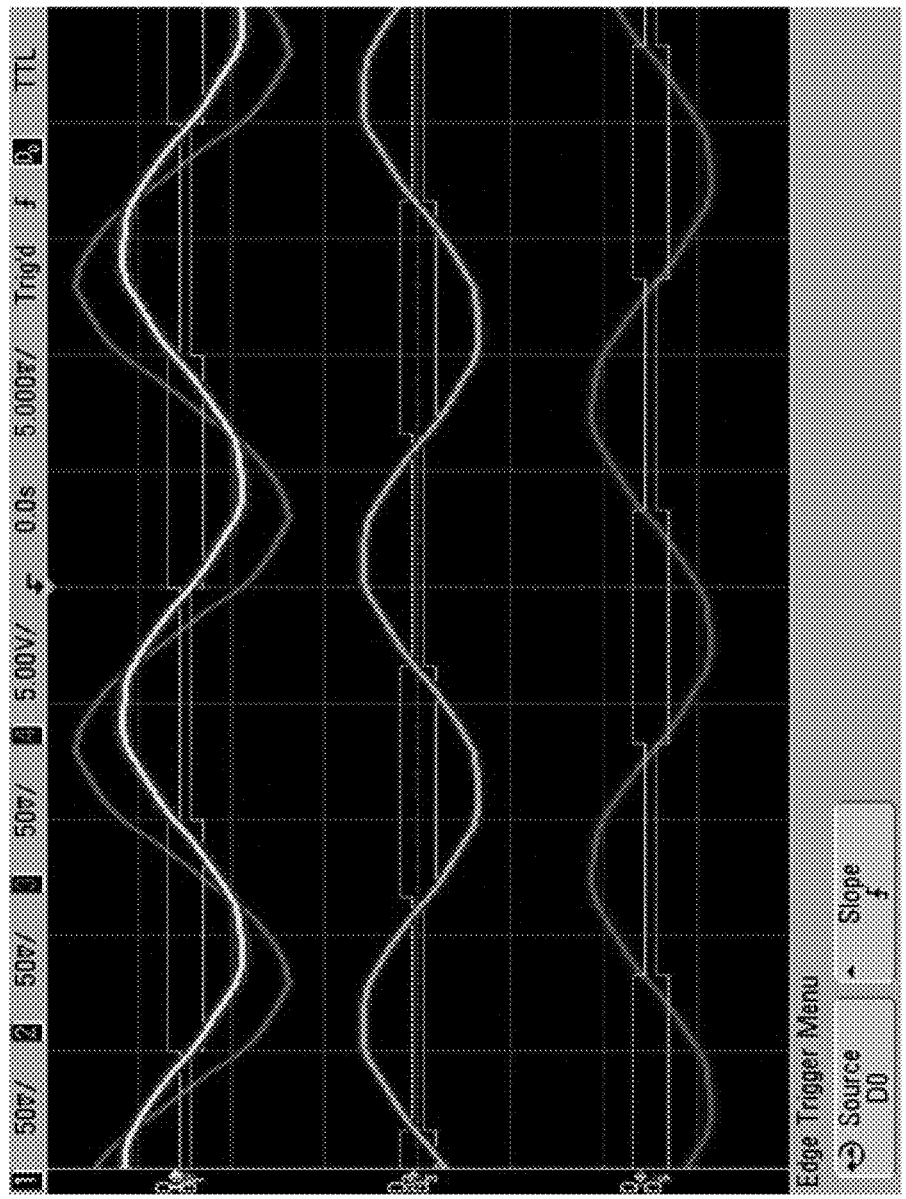
FIG. 2B is an example waveform trace for the three phase currents I1; I2; I3; and the line-to-line voltage U12 between lines L1 and L2, synchronized by the thyristor gate channels, depicting a waveform on balanced pure resistive load on direct system: Z1=Z2=Z3.

FIG. 2B is an example waveform trace for the three phase currents I1; I2; I3; and the line-to-line voltage U12 between lines L1 and L2, synchronized by the thyristor gate channels, depicting a waveform on balanced pure resistive load on direct system: Z1=Z2=Z3.

The channel traces are CH1=I1; CH2=I2; CH3=I3; CH4=U12; D0-D5=Thyristor or SCR gates. The firing is synchronized to line-to-neutral voltage. On a resistive load, line-to-neutral voltage is actually synchronized with current. Thus, instead of using a static PI/6 phase shift to synchronize firing from line-to-line signal to line-to-neutral signal, in accordance with the invention, the current presence signal is used to dynamically measure this phase shift and adjust firing synchronization accordingly. Current transformers CT1, CT2, and CT3 give accurate information on current presence. By checking the transition from positive or negative current to the other state, the phase shift between line-to-line and current can be measured (additional to the original PI/6 shift technique.)

Figure 3A:
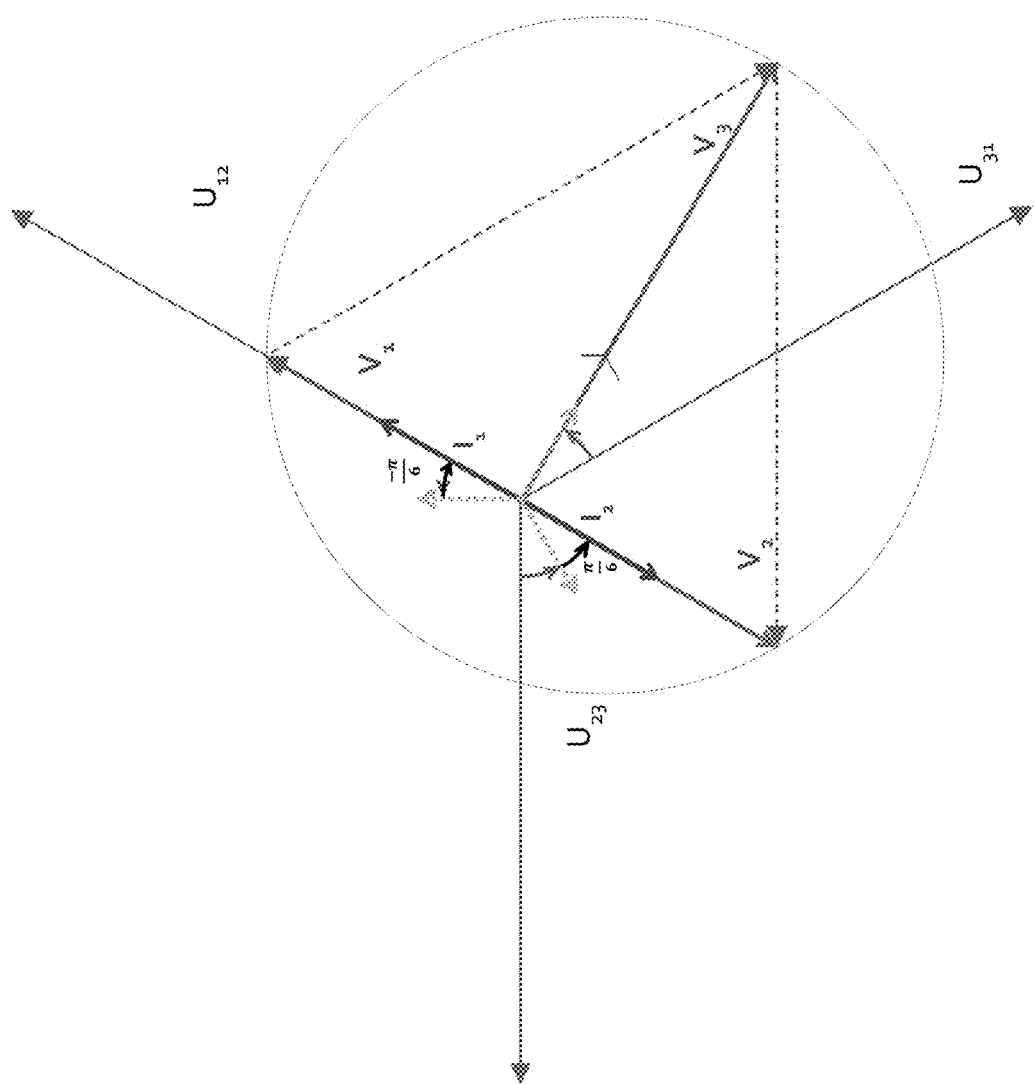
FIG. 3A is an example phasing diagram of a pure resistive 3S load on a direct system: Z3=∞; Z1=Z2, where there has been a total load failure (TLF) for Z3.

FIG. 3A is an example phasing diagram of a pure resistive 3S load on a direct system: Z3=∞; Z1=Z2, where there has been a total load failure (TLF) for Z3.

Figure 3B:
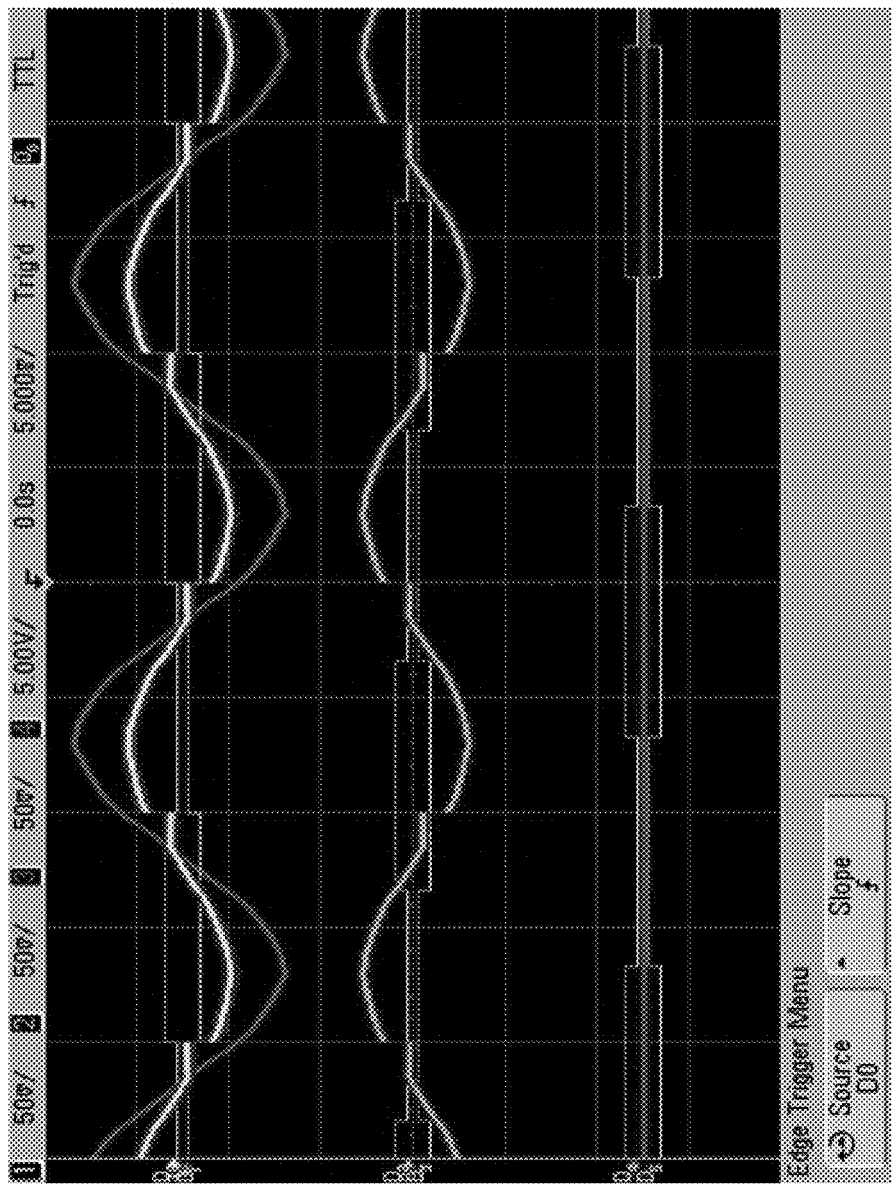
FIG. 3B is an example waveform trace for the two currents I1 and I2 and the line-to-line voltage U12 between lines L1 and L2, synchronized by the thyristor gate channels, depicting a waveform on pure resistive 3S load on direct system: Z3=∞; Z1=Z2, where there has been a total load failure (TLF) for Z3.

FIG. 3B is an example waveform trace for the two currents I1 and I2 and the line-to-line voltage U12 between lines L1 and L2, synchronized by the thyristor gate channels, depicting a waveform on pure resistive 3S load on direct system: Z3=∞; Z1=Z2, where there has been a total load failure (TLF) for Z3. The channel traces are CH1=I1; CH2=I2; CH3=I3; CH4=U12; D0-D5=Thyristor or SCR gates. This trace illustrates that significantly unbalanced phases may cause abrupt changes in the currents I1 and I2, which generate unwanted electromagnetic compatibility (EMC) emissions.

Figure 4A:
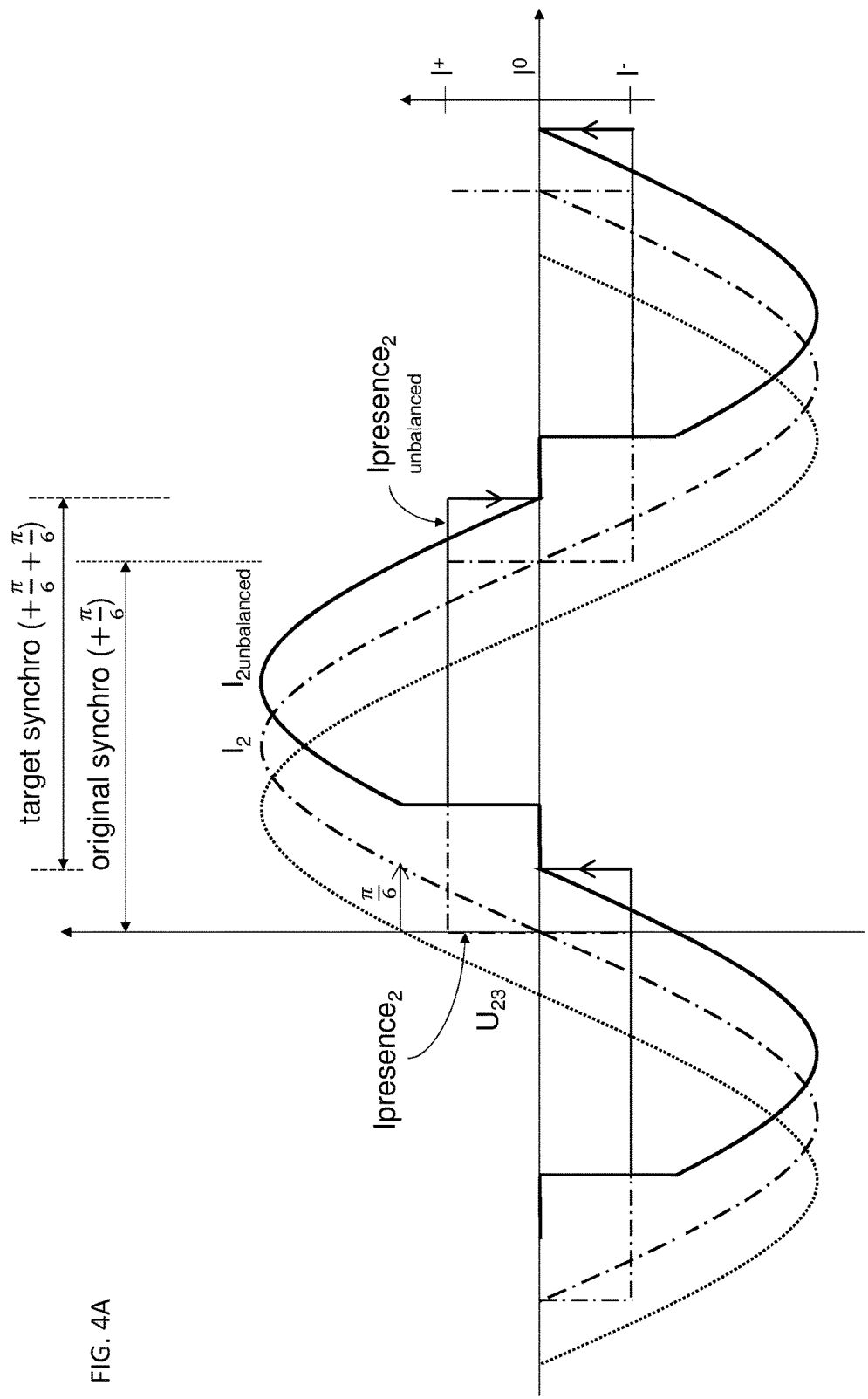
FIG. 4A is an example of the current waveform I2 transitioning from balanced to unbalanced for Z3=Z1=Z2. In accordance with the invention, to rebalance, at every network half-period, the phase shift between line-to-line voltage U23 and current I2 is computed. Then a proportional coefficient is applied to this phase shift value and the result is added to the default π/6 shift. The phase shift value will decrease every half period until it gets down to the target synchronization.

FIG. 4A is an example of the current waveform I2 transitioning from balanced to unbalanced for Z3≠Z1=Z2. In accordance with the invention, to rebalance, at every network half-period, the phase shift between line-to-line voltage U23 and current I2 is computed. Then a proportional coefficient is applied to this phase shift value and the result is added to the default $\pi/6$ shift. The phase shift value will decrease every half period until it gets down to the target synchronization. Speed of decrease depends on the proportional coefficient of this control loop.

The phase shift between line-to-line voltage U23 and current I2 is computed, by the load manager, by determining at network half-periods, a phase shift between line-to-line voltage and current by:

generating a first time stamp of current I2 presence transition from positive or negative to zero during a last previous half-period;

generating a second time stamp of line-to-line U23 zero crossing during the last previous half-period;

applying a proportional coefficient to a difference between the first and second time stamps as a phase shift value and adding the phase shift value to a default phase shift of $\pi/6$;

wherein the phase shift value decreases every half period until a target synchronization is reached; and synchronizing, by the load manager, firing from line-to-line signal U23 to line-to-neutral signal of phases of the three-phase power system, using the decreasing phase shift value.

Figure 4B:
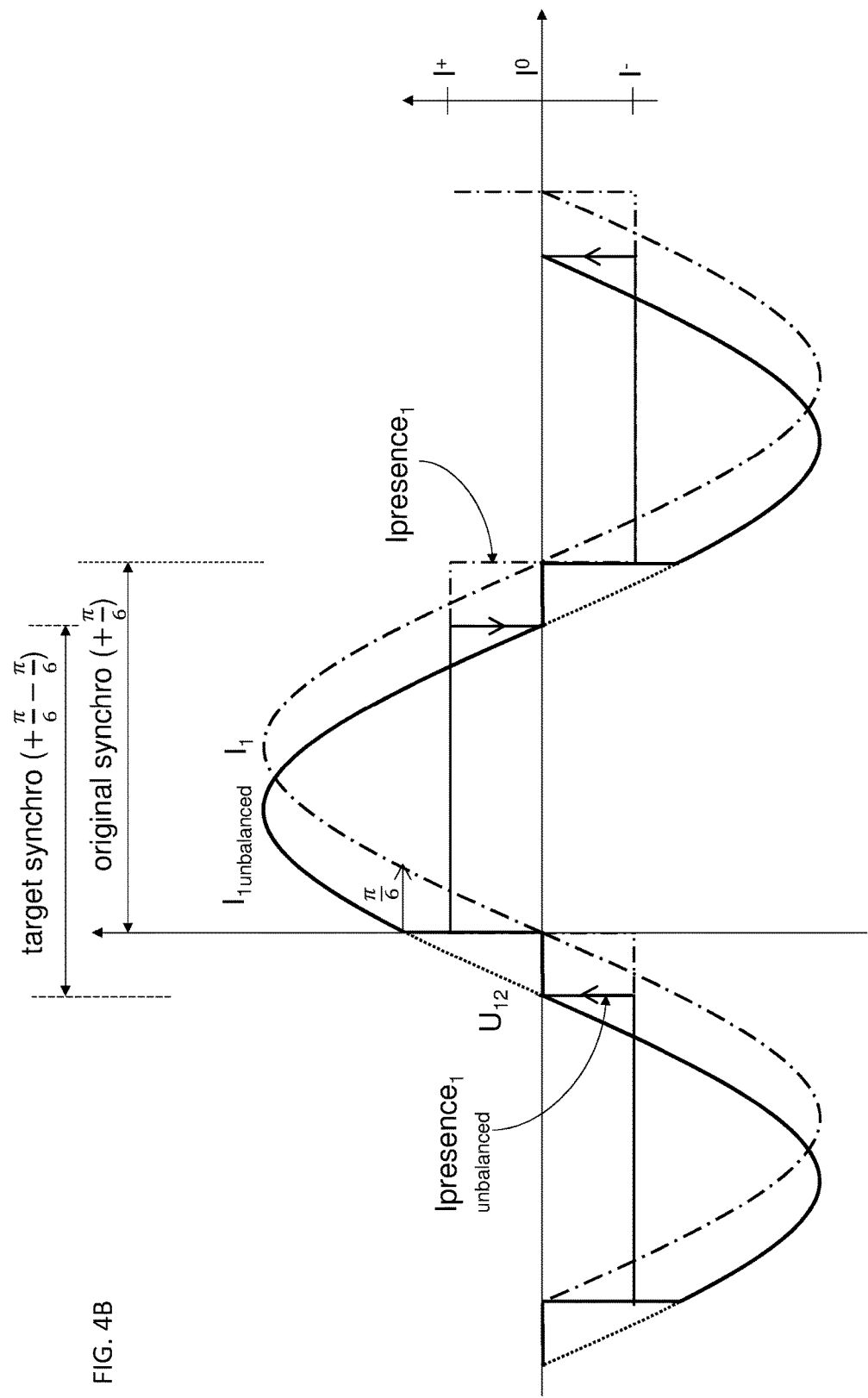
FIG. 4B is an example of the current waveform I1 transitioning from balanced to unbalanced on a Z3 total load failure. In accordance with the invention, to rebalance, at every network half-period, the phase shift between line-to-line voltage U12 and current I1 is computed. Then a proportional coefficient is applied to this phase shift value and the result is added to the default π/6 shift. The phase shift value will decrease every half period until it gets down to the target synchronization.

FIG. 4B is an example of the current waveform I1 transitioning from balanced to unbalanced on a Z3 total load failure. In accordance with the invention, to rebalance, at every network half-period, the phase shift between line-to-line voltage U12 and current I1 is computed. Then a proportional coefficient is applied to this phase shift value and the result is added to the default $\pi/6$ shift. The phase shift value will decrease every half period until it gets down to the target synchronization. Speed of decrease depends on the proportional coefficient of this control loop.

The phase shift between line-to-line voltage U12 and current I1 is computed, by the load manager, by determining at network half-periods, a phase shift between line-to-line voltage and current by:

generating a first time stamp of current I1 presence transition from positive or negative to zero during a last previous half-period;

generating a second time stamp of line-to-line U12 zero crossing during the last previous half-period;

applying a proportional coefficient to a difference between the first and second time stamps as a phase shift value and adding the phase shift value to a default phase shift of $\pi/6$;

wherein the phase shift value decreases every half period until a target synchronization is reached; and synchronizing, by the load manager, firing from line-to-line signal U12 to line-to-neutral signal of phases of the three-phase power system, using the decreasing phase shift value.

Phase shift values given in 50 µs resolution (ADC sampling time), may be transmitted to a filter task every half period of phase 1 (3PH) or phase 2 (2PH) to adjust reloading of the pulse width modulated (PWM) timer. As PWM timer resolution is 0.25 µs, it ensures a gain of 1/200 to the phase shift regulation loop, which ensures stability and smooth behavior of synchronization adjustment. Additionally, the phase shift may be limited to [−PI/6; +PI/6] so as to not overtake filtering and synchronization. (Phase shifts higher than those limits may be seen on slightly inductive loads (see FIG. 6B).

Figure 5:
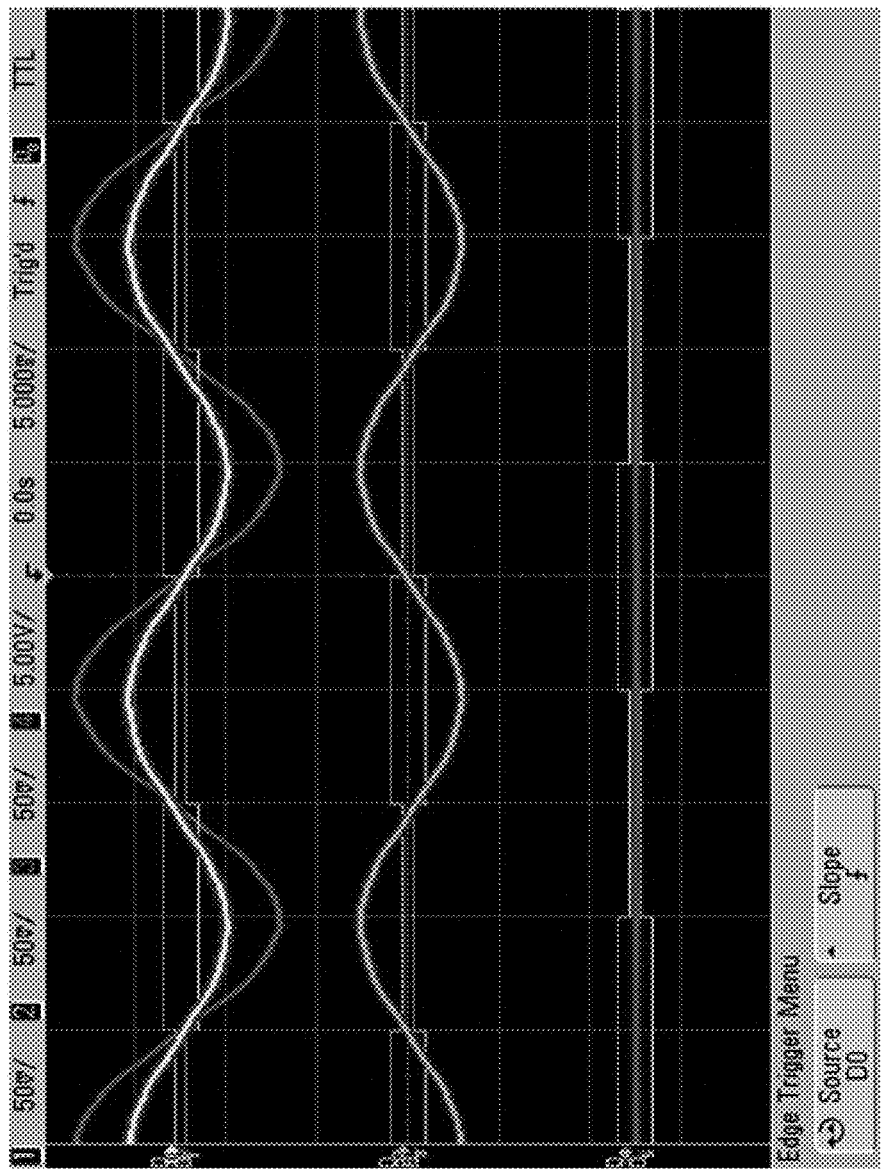
FIG. 5 is an example waveform trace for the two currents I1 and I2 and the line-to-line voltage U12 between lines L1 and L2, synchronized by the thyristor gate channels, depicting a waveform on pure resistive 3S load on direct system: Z3=∞; Z1=Z2, after the phase shift value has been decreased every half period by the process described in FIGS. 4A and 4B, until it gets down to the target synchronization, in accordance with the invention.

FIG. 5 is an example waveform trace for the two currents I1 and I2 and the line-to-line voltage U12 between lines L1 and L2, synchronized by the thyristor gate channels, depicting a waveform on pure resistive 3S load on direct system: Z3=∞; Z1=Z2, after the phase shift value has been decreased every half period by the process described in FIGS. 4A and 4B, until it gets down to the target synchronization, in accordance with the invention.

The channel traces are CH1=I1; CH2=I2; CH3=I3; CH4=U12; D0-D5=Thyristor or SCR gates. The firing is synchronized to line-to-neutral voltage. On a resistive load, line-to-neutral voltage is actually synchronized with current. Thus, instead of using a static PI/6 phase shift to synchronize firing from line-to-line signal to line-to-neutral signal, in accordance with the invention, the current presence signal is used to dynamically measure this phase shift and adjust firing synchronization accordingly. Current transformers CT1, CT2, and CT3 give accurate information on current presence. By checking the transition from positive or negative current to the other state, the phase shift between line-to-line and current can be measured (additional to the original PI/6 shift technique.)

Figure 6A:
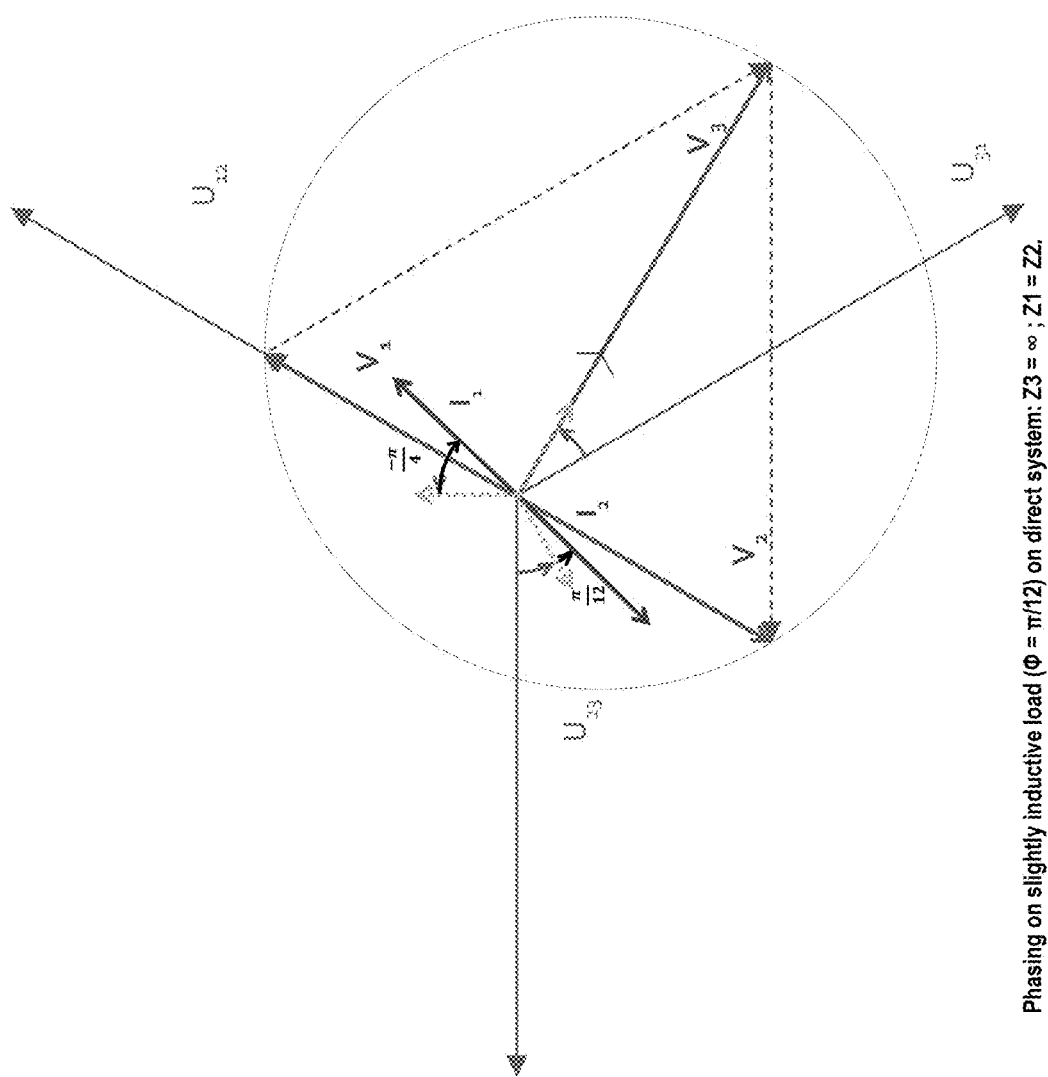
FIG. 6A is an example phasing diagram of a slightly inductive load (Φ=π/12) on direct system: Z3=∞; Z1=Z2, where there has been a total load failure (TLF) for Z3.

FIG. 6A is an example phasing diagram of a slightly inductive load ($\Phi=\pi/12$) on direct system: Z3=∞; Z1=Z2, where there has been a total load failure (TLF) for Z3.

Figure 6B:
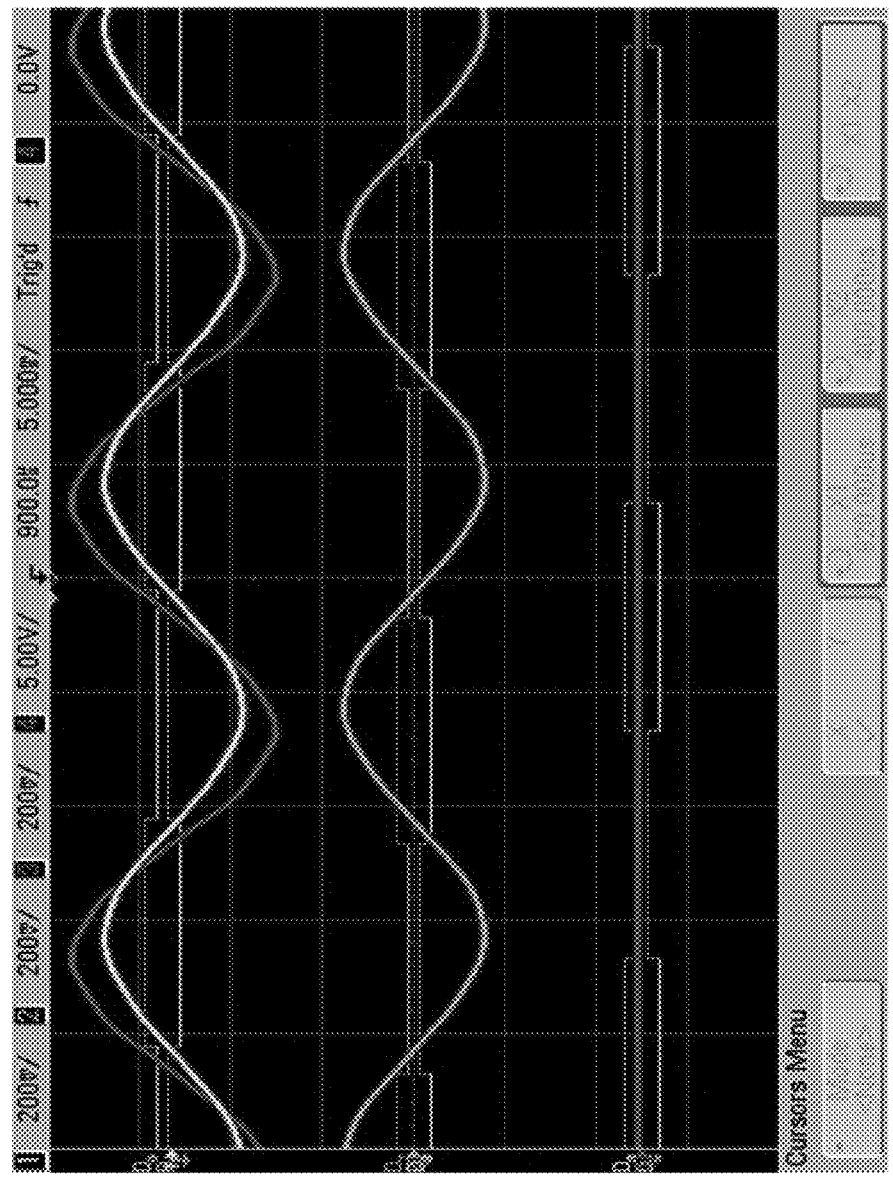
FIG. 6B is an example waveform trace for the two currents I1 and I2 and the line-to-line voltage U12 between lines L1 and L2, synchronized by the thyristor gate channels, depicting a waveform with correction on a slightly inductive load (Φ=π/12) on a direct system: Z3=∞; Z1=Z2, after the phase shift value has been decreased every half period by the process described in FIGS. 4A and 4B, until it gets down to the target synchronization, in accordance with the invention.

FIG. 6B is an example waveform trace for the two currents I1 and I2 and the line-to-line voltage U12 between lines L1 and L2, synchronized by the thyristor gate channels, depicting a waveform with correction on a slightly inductive load ($1=\pi/12$) on a direct system: Z3=∞; Z1=Z2, after the phase shift value has been decreased every half period by the process described in FIGS. 4A and 4B, until it gets down to the target synchronization, in accordance with the invention. The channel traces are CH1=I1; CH2=I2; CH3=I3; CH4=U12; D0-D5=Thyristor or SCR gates. This trace shows that even if phase shift correction is limited to [−PI/6; +PI/6], false firing is not present with this load characteristic ($\phi=\pi/12$).

FIG. 7 illustrates an example embodiment of the invention, showing a system flow diagram of an example method for operating an unbalanced load manager for a three-phase induction motor or heater. The steps of the flow diagram represent computer code instructions stored in the memory 112 of the unbalanced load manager, which when executed by the processor 110, to carry out the functions of the example embodiments of the invention. The steps may be carried out in another order than shown and individual steps may be combined or separated into component steps. The flow diagram has the following steps:

Step 700: A method for operating an unbalanced load manager for a three-phase induction motor or heater comprises:

Step 702: receiving, by the load manager, values representative of current flow and line-to-line voltage between corresponding phases of a three-phase power system providing power to the motor or heater;

Step 704: detecting, by the load manager, a transition from positive or negative to zero current, to measure a phase shift between line-to-line and current;

Step 706: determining, by the load manager, at network half-periods, a phase shift between line-to-line voltage and current by:

Step 708: generating a first time stamp of current presence transition from positive or negative to zero during a last previous half-period;

Step 710: generating a second time stamp of line-to-line zero crossing during the last previous half-period;

Step 712: applying a proportional coefficient to a difference between the first and second time stamps as a phase shift value and adding the phase shift value to a default phase shift;

Step 714: wherein the phase shift value decreases every half period until a target synchronization is reached; and Step 716: synchronizing, by the load manager, firing from line-to-line signal to line-to-neutral signal of phases of the three-phase power system, using the decreasing phase shift value.

The resulting invention provides a way to synchronize electrical power control of a three-phase load on line-to-neutral electrical waveforms, without the need of any electrical neutral reference and whatever load unbalancing ratio. Unbalanced load management may be applied on a resistive load and a slightly inductive load where the load is configured as resistive.

Although specific example embodiments of the invention have been disclosed, persons of skill in the art will appreciate that changes may be made to the details described for the specific example embodiments, without departing from the spirit and the scope of the invention.

The invention claimed is:

1. An unbalanced load manager for a three-phase induction motor or heater comprising:
   a plurality of current sensors associated with the unbalanced load manager, connect with corresponding phases of a three-phase power system providing power to a three-phase motor or heater, each current sensor configured to provide a value representative of current flow it senses through each corresponding phase of the three-phase power system;
   a plurality of voltage taps associated with the unbalanced load manager, connect with the corresponding phases of the three-phase power system providing power to the three-phase motor or heater, with pairs of the voltage taps configured to provide line-to-line voltage between corresponding phases of the three-phase power system;
   a memory in the load manager, configured to store a thyristor or SCR firing calculation algorithm; and
   a processor in the load manager, coupled to the memory and the plurality of current sensors and voltage taps, configured to:
   generate a first time stamp of current transition from positive or negative to zero during a last previous half-period;
   generate a second time stamp of line-to-line zero crossing during the last previous half-period;
   apply a proportional coefficient to a difference between the first and second time stamps as a phase shift value and adding the phase shift value to a default phase shift as a measured phase shift; and
   synchronize firing from line-to-line signal to line-to-neutral signal of phases of the three-phase power system providing power to the motor or heater, using the measured phase shift between line-to-line and current.

2. A method for operating an unbalanced load manager for a three-phase induction motor or heater comprises:
   receiving, by the load manager, values representative of current flow sensed by current sensors and voltages sensed by voltage taps corresponding to phases of a three-phase power system providing power to the motor or heater;
   detecting, by the load manager, a transition from positive or negative to zero current, to measure a phase shift between line-to-line and current;
   generating a first time stamp of current transition from positive or negative to zero during a last previous half-period;
   generating a second time stamp of line-to-line zero crossing during the last previous half-period;
   applying a proportional coefficient to a difference between the first and second time stamps as a phase shift value and adding the phase shift value to a default phase shift as a measured phase shift; and
   synchronizing, by the load manager, firing from line-to-line signal to line-to-neutral signal of phases of the three-phase power system providing power to the motor or heater, using the measured phase shift between line-to-line and current.

3. A method for operating an unbalanced load manager for a three-phase induction motor or heater comprises:
   receiving, by the load manager, values representative of current flow and line-to-line voltage between corresponding phases of a three-phase power system providing power to the motor or heater;
   detecting, by the load manager, a transition from positive or negative to zero current, to measure a phase shift between line-to-line and current;
   determining, by the load manager, at network half-periods, a phase shift between line-to-line voltage and current by:
   generating a first time stamp of current transition from positive or negative to zero during a last previous half-period;
   generating a second time stamp of line-to-line zero crossing during the last previous half-period;
   applying a proportional coefficient to a difference between the first and second time stamps as a phase shift value and adding the phase shift value to a default phase shift;
   wherein the phase shift value decreases every half period until a target synchronization is reached; and
   synchronizing, by the load manager, firing from line-to-line signal to line-to-neutral signal of phases of the three-phase power system, using the decreasing phase shift value.

4. The method of claim 3, wherein for currents transitioning from balanced to unbalanced for equal loads ($Z3=Z1=Z2$) in the three-phase motor or heater, comprising:
   adjusting a current waveform (I2) in the load (Z2) in the motor or heater at every network half-period;
   computing a phase shift value between a line-to-line voltage (U23) and current (I2); and
   applying a proportional coefficient for the phase shift value (I2) and adding a result to a default $\pi/6$ shift, causing the phase shift value (I2) to decrease every half period until it reaches a target synchronization.

5. The method of claim 3, wherein for currents transitioning from balanced to unbalanced for a total load failure of a load (Z3) in the three-phase motor or heater, comprising:
   adjusting a current waveform (I1) in a load (Z1) in the motor or heater at every network half-period;
   computing a phase shift value between a line-to-line voltage (U12) and current (I1); and
   applying a proportional coefficient for the phase shift value (I1) and adding a result to a default $\pi/6$ shift, causing the phase shift value (I1) to decrease every half period until it reaches a target synchronization.

\* \* \* \* \*